(12) United States Patent
Gao et al.

(10) Patent No.: US 11,943,473 B2
(45) Date of Patent: Mar. 26, 2024

(54) VIDEO DECODING METHOD AND APPARATUS, VIDEO ENCODING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Xinwei Gao, Shenzhen (CN); Weiran Li, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 17/470,960

(22) Filed: Sep. 9, 2021

(65) Prior Publication Data

US 2021/0409763 A1 Dec. 30, 2021

Related U.S. Application Data

(63) Continuation of application No. PCT/CN2020/116652, filed on Sep. 22, 2020.

(30) Foreign Application Priority Data

Sep. 27, 2019 (CN) .......................... 201910927943.1

(51) Int. Cl.
*H04N 19/59* (2014.01)
*H04N 19/105* (2014.01)
(Continued)

(52) U.S. Cl.
CPC ........... *H04N 19/59* (2014.11); *H04N 19/105* (2014.11); *H04N 19/176* (2014.11); *H04N 19/33* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2007/0160153 A1* | 7/2007 | Sullivan | H04N 19/61 |
| | | | 375/E7.193 |
| 2008/0267291 A1* | 10/2008 | Vieron | H04N 19/30 |
| | | | 375/E7.17 |

(Continued)

FOREIGN PATENT DOCUMENTS

| | | |
|---|---|---|
| CN | 107113442 A | 8/2017 |
| CN | 108495130 A | 9/2018 |

(Continued)

OTHER PUBLICATIONS

Tencent Technology, ISR, PCT/CN2020/116652, dated Dec. 28, 2020, 2 pgs.

(Continued)

*Primary Examiner* — David N Werner
(74) *Attorney, Agent, or Firm* — Morgan, Lewis & Bockius LLP

(57) ABSTRACT

A video decoding method is disclosed and performed by an electronic device, the method including: obtaining a first resolution used in decoding a current block and a second resolution used in decoding a reference block in a current video frame, the reference block being a reference block used for performing directional prediction on the current block in the current video frame; building a reconstruction block from the reference block; when the first resolution is greater than the second resolution, adjusting the reconstruction block of the reference block to the first resolution to obtain a first reconstruction block; and performing directional prediction on the current block according to the first reconstruction block and the current block.

17 Claims, 5 Drawing Sheets

(51) Int. Cl.
*H04N 19/176* (2014.01)
*H04N 19/33* (2014.01)
*H04N 19/593* (2014.01)

(56) References Cited

U.S. PATENT DOCUMENTS

| | | | |
|---|---|---|---|
| 2009/0010333 A1* | 1/2009 | Tourapis | H04N 19/70 375/E7.199 |
| 2011/0142356 A1* | 6/2011 | Uemori | H04N 19/85 382/233 |
| 2013/0176211 A1* | 7/2013 | Inada | H04N 19/137 345/156 |
| 2014/0064360 A1* | 3/2014 | Rapaka | H04N 19/593 375/240.12 |
| 2014/0119168 A1 | 5/2014 | Matoba | |
| 2014/0198846 A1* | 7/2014 | Guo | H04N 19/59 375/240.12 |
| 2015/0036754 A1* | 2/2015 | Hendry | H04N 19/43 375/240.25 |
| 2015/0078446 A1* | 3/2015 | Jun | H04N 19/59 375/240.12 |
| 2015/0195532 A1* | 7/2015 | Nakagami | H04N 19/124 375/240.12 |
| 2015/0195566 A1* | 7/2015 | Hinz | H04N 19/587 |
| 2015/0319447 A1* | 11/2015 | Minoo | H04N 19/182 375/240.12 |
| 2016/0088303 A1* | 3/2016 | Lee | H04N 19/186 375/240.12 |
| 2016/0094853 A1* | 3/2016 | Ye | H04N 19/44 375/240.12 |
| 2016/0156912 A1* | 6/2016 | Alshina | H04N 19/117 375/240.12 |
| 2016/0219287 A1* | 7/2016 | Lee | H04N 19/187 |
| 2017/0180745 A1 | 6/2017 | Bai | |
| 2018/0091818 A1 | 3/2018 | Persson et al. | |
| 2021/0099722 A1* | 4/2021 | Da Silva Pratas Gabriel | H04N 19/119 |

FOREIGN PATENT DOCUMENTS

| | | |
|---|---|---|
| CN | 108833916 A | 11/2018 |
| CN | 108848376 A | 11/2018 |
| CN | 110662071 A | 1/2020 |
| EP | 2557793 A1 | 2/2013 |

OTHER PUBLICATIONS

Tencent Technology, WO, PCT/CN2020/116652, dated Dec. 28, 2020, 5 pgs.
Tencent Technology, IPRP, PCT/CN2020/116652, dated Mar. 15, 2022, 6 pgs.
Extended European Search Report, EP20869162.6, dated Jul. 4, 2022, 9 pgs.
Jonathan Pfaff et al., "CE3: Affine Linear Weighted Intra Prediction (CE3-4.1, CE3-4.2)", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0217, Mar. 25, 2019, XP030256694, 17 pgs., Retrieved from the Internet: http://phenix.int-evry.fr/jvet/doc_end_user/documents/14_Geneva/wg11/JVET-N0217-v3.zip.
Zhang et al., "CE3: Sample value clipping on MIP reduced prediction", 15th Meeting, Gothenburg, (The Joint Video Exploration Team of ISO/IEC JTC1/SC29/WG11 and ITU-T SG.16), JVET-O0160, Jun. 20, 2019, XP030205722, 7 pgs., Retrieved from the Internet: http://phenix.int-evry.fr/jvet/doc_end_user/documents/15_Gothenburg/wg11/JVET-O0160-v1.zip.
Tencent Technology, Extended European Search Report, EP20869162.6, dated Aug. 17, 2023, 5 pgs.

* cited by examiner

VIDEO DECODING METHOD AND APPARATUS, VIDEO ENCODING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/116652, entitled "VIDEO DECODING METHOD AND APPARATUS, VIDEO ENCODING METHOD AND APPARATUS, STORAGE MEDIUM AND ELECTRONIC DEVICE" filed on Sep. 22, 2020, which claims priority to Chinese Patent Application No. 201910927943.1, entitled "VIDEO DECODING METHOD AND APPARATUS, STORAGE MEDIUM, AND ELECTRONIC DEVICE" and filed with the China National Intellectual Property Administration on Sep. 27, 2019, all of which are incorporated herein by reference in their entirety.

FIELD OF THE TECHNOLOGY

This application relates to the field of audio and video encoding and decoding, and specifically, to a video decoding method and apparatus, a video encoding method and apparatus, a storage medium, and an electronic device.

BACKGROUND OF THE DISCLOSURE

With the development of digital media technologies and computer technologies, videos are applied to various fields, such as mobile communication, network monitoring, and network television. With the improvement of hardware performance and screen resolutions, users have increasing demand for high-definition videos.

Under the condition of a limited mobile bandwidth, existing codecs generally use the same resolution to encode and decode video frames, which leads to a relatively low peak signal to noise ratio (PSNR) in partial bandwidth, and further leads to distortion of the video frames, resulting in poor video playback quality. In the related art, proposals have been made to reduce distortion of video frames by adjusting resolutions used in encoding and decoding different video blocks. However, after the resolutions of encoding and decoding the video blocks are adjusted, directional prediction cannot be performed due to the different resolutions. Consequently, encoding and decoding cannot be performed.

For the foregoing problems, no effective solution has been provided.

SUMMARY

A video decoding method is performed by an electronic device, the method including: obtaining a first resolution used in decoding a current block and a second resolution used in decoding a reference block in a current video frame, the reference block being a reference block used for performing directional prediction on the current block in the current video frame; building a reconstruction block from the reference block; when the first resolution is greater than the second resolution, adjusting the reconstruction block of the reference block to the first resolution to obtain a first reconstruction block; and performing directional prediction on the current block according to the first reconstruction block and the current block.

A video encoding method is performed by an electronic device, the method including: obtaining a first resolution used in encoding a current block and a second resolution used in encoding a reference block in a current video frame, the reference block being a reference block used for performing directional prediction on the current block in the current video frame; adjusting, in a case that the first resolution is greater than the second resolution, a reconstruction block of the reference block to the first resolution to obtain a first reconstruction block; and performing directional prediction on the current block according to the first reconstruction block and the current block.

One or more non-transitory computer-readable storage media storing computer-readable instructions are provided, the computer-readable instructions, when executed by one or more processors of an electronic device, causing the electronic device to perform the following steps: obtaining a first resolution used in decoding a current block and a second resolution used in decoding a reference block in a current video frame, the reference block being a reference block used for performing directional prediction on the current block in the current video frame; building a reconstruction block from the reference block; when the first resolution is greater than the second resolution, adjusting the reconstruction block of the reference block to the first resolution to obtain a first reconstruction block; and performing directional prediction on the current block according to the first reconstruction block and the current block.

An electronic device is provided, including a memory and one or more processors, the memory storing computer-readable instructions, and the computer-readable instructions, when executed by the one or more processors, causing the one or more processors to perform the following steps: obtaining a first resolution used in decoding a current block and a second resolution used in decoding a reference block in a current video frame, the reference block being a reference block used for performing directional prediction on the current block in the current video frame; building a reconstruction block from the reference block; when the first resolution is greater than the second resolution, adjusting the reconstruction block of the reference block to the first resolution to obtain a first reconstruction block; and performing directional prediction on the current block according to the first reconstruction block and the current block.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, a video decoding method is provided. In some embodiments, the video decoding method may be applied to, but not limited to, an application environment shown in FIG. 1. The application environment includes a terminal 102 and a server 104. The terminal 102 communicates with the server 104 by using a network. The terminal 102 may be, but is not limited to, a smartphone, a tablet computer, a laptop computer, a desktop computer, or the like. The server 104 may be, but is not limited to, a computer processing device with a strong data processing capability and a certain storage space.

Figure 1:
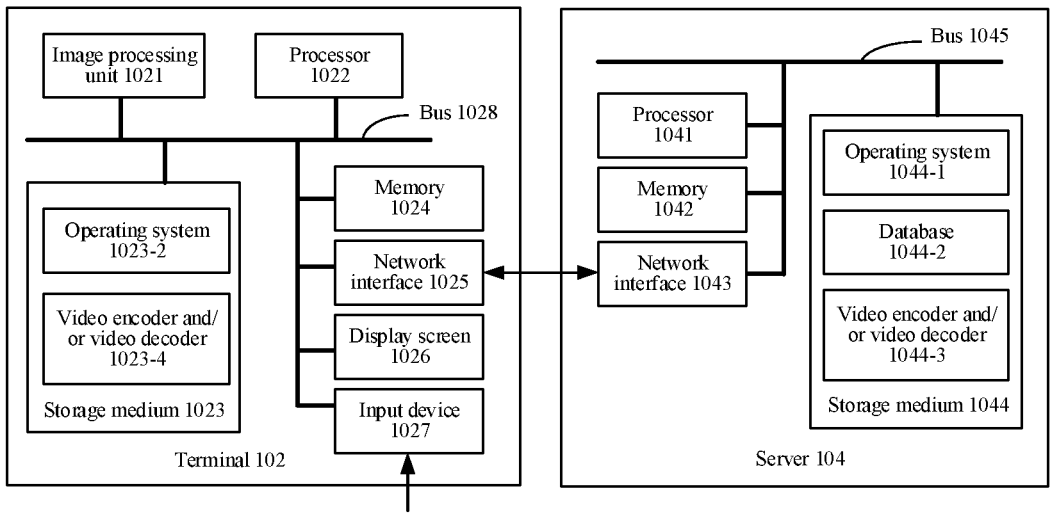
FIG. 1 is a schematic diagram of an application environment of an exemplary video decoding method according to an embodiment of this application.

A video encoding method corresponding to the foregoing video decoding method may also be applied to, but not limited to, the application environment shown in FIG. 1. After a to-be-encoded video is obtained, according to but not limited to the video encoding method provided in this application, through an interaction process between the terminal 102 and the server 104 shown in FIG. 1, a resolution of a reference block is adjusted, so that directional prediction may be performed on a current block after the resolution is adjusted, thereby implementing encoding of the to-be-encoded video when the resolution of video blocks is different. In addition, after a to-be-decoded video is obtained, similarly, according to but not limited to the video decoding method provided in this application, through an interaction process between the terminal 102 and the server 104 shown in FIG. 1, a resolution of a reference block is adjusted, so that directional prediction may be performed on a current block after the resolution is adjusted, thereby implementing decoding of the to-be-decoded video when the resolution of video blocks is different.

In an embodiment, as shown in FIG. 1, the terminal 102 may include, but is not limited to, the following components: an image processing unit 1021, a processor 1022, a storage medium 1023, a memory 1024, a network interface 1025, a display screen 1026, and an input device 1027. The foregoing components may be connected by using, but not limited to, a system bus 1028. The image processing unit 1021 is configured to provide at least a drawing capability of a display interface. The processor 1022 is configured to provide computing and control capabilities, to support running of the terminal 102. The storage medium 1023 stores an operating system 1023-2, a video encoder and/or video decoder 1023-4. The operating system 1023-2 is configured to provide control operation instructions. The video encoder and/or video decoder 1023-4 is configured to perform encoding/decoding operations according to the control operation instructions. In addition, the memory provides a running environment for the video encoder and/or video decoder 1023-4 in the storage medium 1023, and the network interface 1025 is configured to perform network communication with the network interface 1043 in the server 104. The display screen is configured to display an application interface and the like, such as decoding a video; and the input device 1027 is configured to receive a command, data, or the like entered by a user. For a terminal 102 with a touchscreen, the display screen 1026 and the input device 1027 may be the touchscreen. The internal structure of the terminal 102 shown in FIG. 1 is merely a block diagram of a part of the structure related to the solution in this application, and does not constitute a limitation on the terminal to which the solution in this application is applied. Specifically, the terminal or server may include more components or fewer components than those shown in the figure, or some components may be combined, or a different component deployment may be used.

In an embodiment, as shown in FIG. 1, the server 104 may include, but is not limited to, the following components: a processor 1041, a memory 1042, a network interface 1043, and a storage medium 1044. The foregoing components may be connected by using, but not limited to, a system bus 1045. The storage medium 1044 includes an operating system 1044-1, a database 1044-2, a video encoder and/or video decoder 1044-3. The processor 1041 is configured to provide computing and control capabilities, to support running of the server 104. The memory 1042 provides an environment for the running of the video encoder and/or the video decoder 1044-3 in the storage medium 1044. The network interface 1043 communicates with the network interface 1025 of the external terminal 102 by using a network. The operating system 1044-1 in the storage medium is configured to provide control operation instructions; the video encoder and/or video decoder 1044-3 is configured to perform encoding/decoding operations according to the control operation instructions; and the database 1044-2 is configured to store data. The internal structure of the server 104 shown in FIG. 1 is merely a block diagram of a part of the structure related to the solution in this application, and does not constitute a limitation on a computer device to which the solution in this application is applied. A specific computer device has a different component deployment.

In an embodiment, the foregoing network may include, but is not limited to, a wired network. The wired network may include, but is not limited to, a wide area network, a metropolitan area network, and a local area network. The foregoing description is merely an example, and this is not limited in this embodiment.

Figure 2:
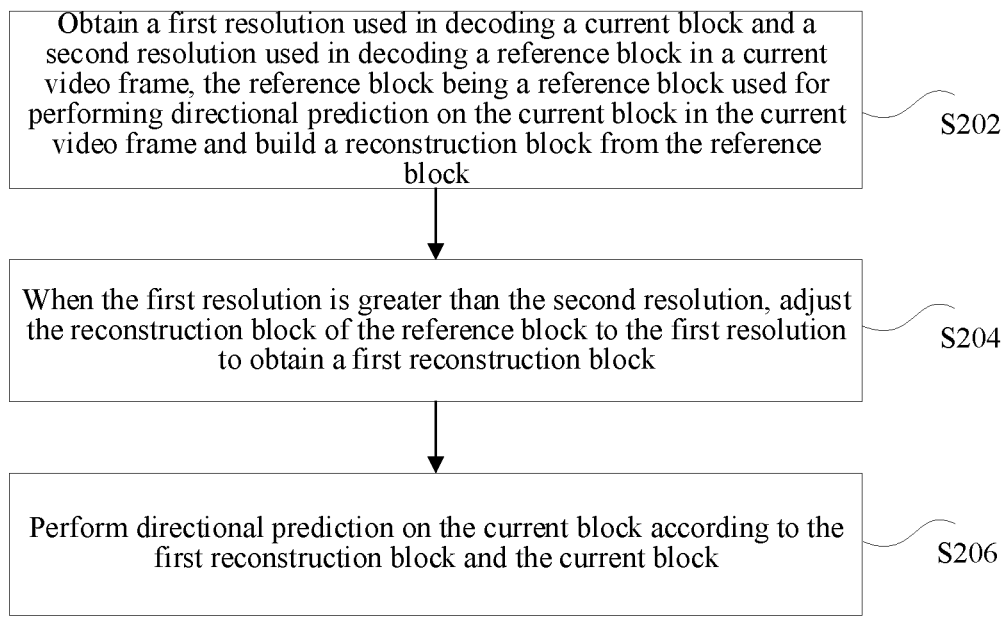
FIG. 2 is a flowchart of an exemplary video decoding method according to an embodiment of this application.

According to an aspect of the embodiments of this application, a video decoding method is provided. As shown in FIG. 2, the method includes:

S202. Obtain a first resolution used in decoding a current block and a second resolution used in decoding a reference block in a current video frame, the reference block being a reference block used for performing directional prediction on the current block in the current video frame, and build a reconstruction block from the reference block.

S204. When the first resolution is greater than the second resolution, adjust the reconstruction block of the reference block to the first resolution to obtain a first reconstruction block.

S206. Perform directional prediction on the current block according to the first reconstruction block and the current block.

The video decoding method shown in FIG. 2 may be applied to, but not limited to, the video decoder shown in FIG. 1. The decoding process of the current video frame is completed through interaction of the video decoder and other components.

In some embodiments, the video decoding method may be applied to, but not limited to, application scenarios such as video playback applications, video sharing applications, or video session applications. Videos transmitted in the foregoing application scenarios may include, but is not limited to, long videos and short videos. For example, a long video may be a play episode with a long playback time (for example, the playback time is greater than 10 minutes), or a picture displayed in a long video session; and a short video may be a voice message between two or more parties, or a video with a short playback time (for example, the playback time is less than or equal to 30 seconds) displayed on a sharing platform. The foregoing description is merely an example. The video decoding method provided in this embodiment may be applied to, but not limited to, a playback device configured to play videos in the foregoing application scenarios. After encoded bitstream data is obtained, directional prediction is performed on current blocks in each current video frame, to perform decoding.

During video encoding, different video blocks in a video frame may be encoded by using different resolutions, thereby overcoming distortion caused by the use of the same resolution in the related art, and ensuring video playback quality. In this embodiment, during video decoding, when the first resolution of the current block is greater than the second resolution of the reference block, the reconstruction block of the reference block may be adjusted to the first resolution, to obtain the first reconstruction block, so that directional prediction may be performed on the current block according to the first reconstruction block and the current block with the same resolution. In this embodiment of this application, the resolution of the current block needs to be adjusted. The adjustment herein may be performed on the resolution of the reconstruction block of the reference block, so that directional prediction can be performed on the current block without actually changing the original reference block. Certainly, this may alternatively be applied to the encoding process.

In this embodiment, the first resolution used in decoding the current block and the second resolution used in decoding the reference block in the current video frame are obtained; when the first resolution is greater than the second resolution, the reconstruction block of the reference block is adjusted to the first resolution to obtain the first reconstruction block, so that the adjusted resolution of the first reconstruction block is the same as the resolution of the current block; and directional prediction may be performed on the current block according to the first reconstruction block and the current block, achieving a technical effect of performing directional prediction even when the resolutions of the video blocks are different, and resolving the technical problem that directional prediction cannot be performed due to the different resolutions of the video blocks.

In some embodiments, after a current video frame in a to-be-decoded video is determined from a bitstream received by an encoding device, and before the current video frame is decoded, a reference video frame may be determined from a video frame that is decoded before the current video frame, but this application is not limited thereto, and a reference block in the reference video frame is then determined. In this embodiment of this application, an encoding mode of the reference video frame may be determined in the following manner:

1) Obtain a preset flag bit in the bitstream, and determine the encoding mode used in the reference video frame according to the flag bit, such as intra-frame decoding or inter-frame decoding.

2) Perform encoding according to an agreement with the encoding device at the encoder side, and determine the encoding mode used in the decoded reference video frame after the decoding, such as intra-frame decoding or inter-frame decoding.

Figure 3:
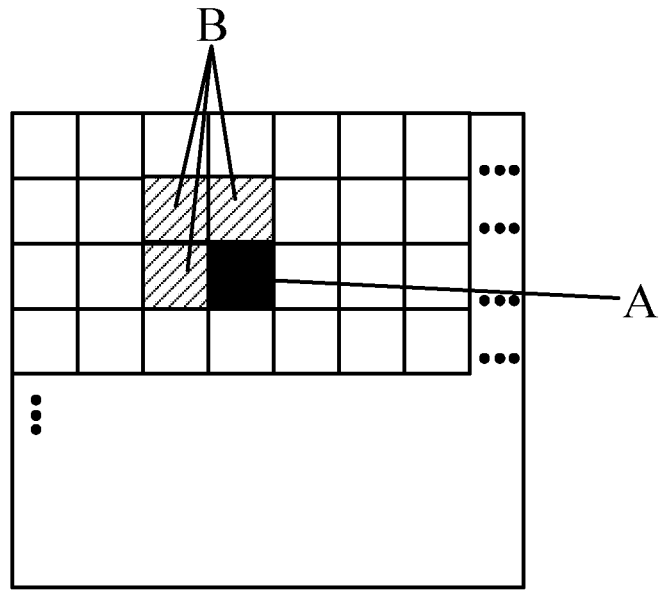
FIG. 3 is a schematic diagram of an exemplary video decoding method according to an embodiment of this application.

For the reference block in this embodiment of this application, as shown in FIG. 3, directional prediction may be performed according to an upper reference edge and a left reference edge of a current block A. Therefore, in this embodiment of this application, the reference block may be a video block on a left side of the current block, a video block on an upper side of the current block, and a video block at an upper left corner of the current block, that is, the video blocks B shown in FIG. 3. It may be understood that the determining of the reference block described above is only an embodiment provided in this application, and the determining of the reference block is not limited in this application. In this embodiment of this application, there may be one or more reference blocks.

Figure 4:
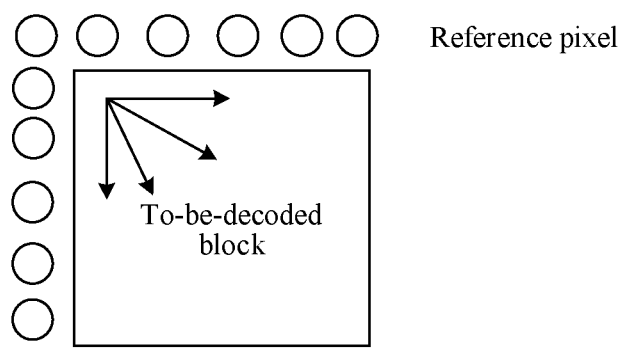
FIG. 4 is a schematic diagram of another exemplary video decoding method according to an embodiment of this application.

As shown in FIG. 4, in this embodiment of this application, the performing directional prediction on the current block according to the reference block may be: performing directional prediction on the current block according to pixels in a plurality of reference blocks. The pixels herein may be referred to as reference pixels.

Figure 5:
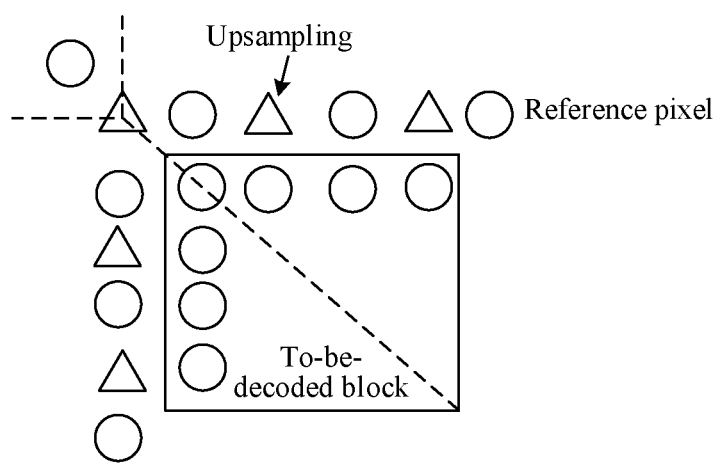
FIG. 5 is a schematic diagram of still another exemplary video decoding method according to an embodiment of this application.

In some embodiments, the adjusting a reconstruction block of the reference block to the first resolution to obtain a first reconstruction block includes: performing upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the performing directional prediction on the current block according to the first reconstruction block and the current block includes: performing directional prediction on the current block according to the first reference pixel and a prediction point in the current block, the prediction point being a pixel used for performing directional prediction in the current block. As shown in FIG. 5, in this embodiment of this application, because directional prediction is performed according to the reference pixels, during adjustment of the resolution of the reference block, up-sampling interpolation processing may be performed on the first reference pixel in the reconstruction block of the reference block without adjusting the entire reference block, thereby reducing consumption of computing resources.

In some embodiments, after the obtaining a first resolution used in decoding a current block and a second resolution used in decoding a reference block in a current video frame, the method further includes: adjusting, when the first resolution is less than the second resolution, a reconstruction block of the reference block to the first resolution to obtain a second reconstruction block; and performing directional prediction on the current block according to the second reconstruction block and the current block. When the first resolution is less than the second resolution, the reconstruction block of the reference block may be adjusted to the first resolution, to obtain the second reconstruction block, so that directional prediction may be performed on the current block according to the second reconstruction block and the current block with the same resolution. The reconstruction block of the reference block may be adjusted to the first resolution through downsampling.

In some embodiments, the adjusting a reconstruction block of the reference block to the first resolution to obtain a second reconstruction block includes: downsampling a second reference pixel in the reconstruction block of the reference block to the first resolution, to obtain the second reconstruction block, the second reference pixel being a pixel used for performing directional prediction on the current block in the reconstruction block of the reference block; and the performing directional prediction on the current block according to the second reconstruction block and the current block includes: performing directional prediction on the current block according to the second reference pixel and a prediction point in the current block, the prediction point being a pixel used for performing directional prediction in the current block. Because directional prediction is performed according to the reference pixels, during adjustment of the resolution of the reference block, the second reference pixel in the reconstruction block of the reference block may be downsampled without adjusting the entire reference block, thereby reducing consumption of computing resources.

Figure 6:
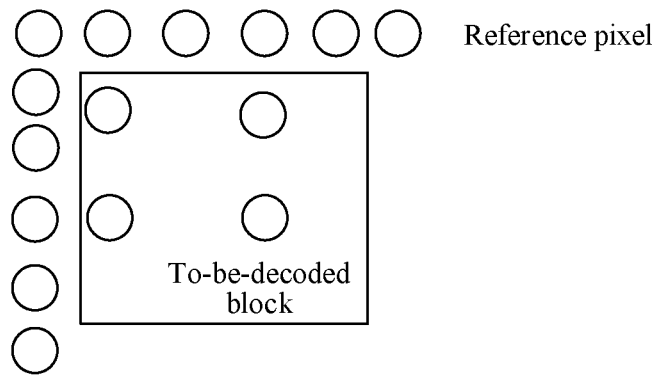
FIG. 6 is a schematic diagram of still another exemplary video decoding method according to an embodiment of this application.

In some embodiments, after the obtaining a first resolution used in decoding a current block and a second resolution used in decoding a reference block in a current video frame, the method further includes: determining a third reference pixel in the reference block when the first resolution is less than the second resolution, the third reference pixel being a pixel used for performing directional prediction on the current block in the reference block, and a resolution represented by the third reference pixel in the reference block being equal to the first resolution; and performing directional prediction on the current block according to the third reference pixel and a prediction point in the current block, the prediction point being a pixel used for performing directional prediction in the current block. In this embodiment of this application, when the first resolution is less than the second resolution, the reference block may be adjusted to the first resolution according to the foregoing embodiment, or the resolution of the reference block may not be adjusted, and a pixel at the corresponding position, that is, the third reference pixel, may be selected from the reference block for directional prediction, so that resolution adjustment is not required. As shown in FIG. 6, when directional prediction is performed on the third reference pixel according to this embodiment of this application, and upsampling is required for directional prediction at the same resolution, because the second resolution is greater than the first resolution, uploading is not required, and pixels other than the third reference pixel may be used as interpolation results to be replaced during interpolation, thereby performing directional prediction.

Figure 7:
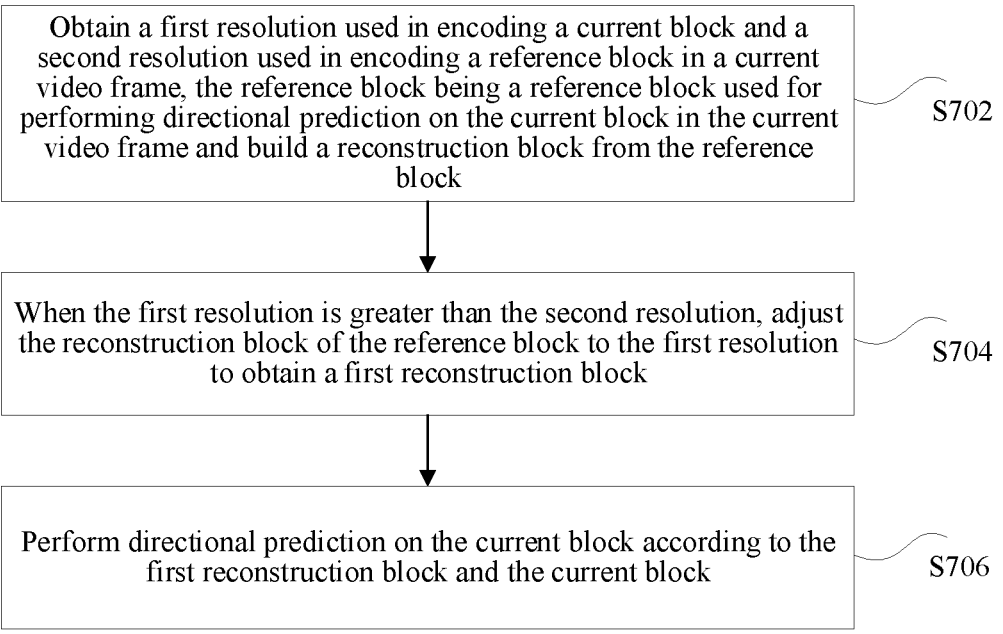
FIG. 7 is a flowchart of an exemplary video encoding method according to an embodiment of this application.

According to another aspect of the embodiments of this application, a video encoding method is provided. As shown in FIG. 7, the method includes:

S702. Obtain a first resolution used in encoding a current block and a second resolution used in encoding a reference block in a current video frame, the reference block being a reference block used for performing directional prediction on the current block in the current video frame, and build a reconstruction block from the reference block.

S704. When the first resolution is greater than the second resolution, adjust the reconstruction block of the reference block to the first resolution to obtain a first reconstruction block.

S706. Perform directional prediction on the current block according to the first reconstruction block and the current block.

The video encoding method shown in FIG. 7 may be used in, but not limited to, the video encoder shown in FIG. 1. The encoding process of the current video frame is completed through interaction of the video encoder and other components.

In some embodiments, the video encoding method may be applied to, but not limited to, application scenarios such as video playback applications, video sharing applications, or video session applications. Videos transmitted in the foregoing application scenarios may include, but is not limited to, long videos and short videos. For example, a long video may be a play episode with a long playback time (for example, the playback time is greater than 10 minutes), or a picture displayed in a long video session; and a short video may be a voice message between two or more parties, or a video with a short playback time (for example, the playback time is less than or equal to 30 seconds) displayed on a sharing platform. The foregoing description is merely an example. The video encoding method provided in this embodiment may be applied to, but not limited to, a playback device configured to play videos in the foregoing application scenarios. After encoded bitstream data is obtained, directional prediction is performed on current blocks in each current video frame, to perform encoding.

During video encoding, different video blocks in a video frame may be encoded by using different resolutions, thereby overcoming distortion caused by the use of the same resolution in the related art, and ensuring video playback quality. In this embodiment, the resolution of the current block in the current video frame is adjusted to the target resolution to obtain the first reconstruction block. A forward reference frame and a backward reference frame of the current block are adjusted to the target resolution, and combined into a virtual reference frame, thereby facilitating determining of a motion vector (MV) of the first reconstruction block relative to a corresponding region in the virtual reference frame. It may be understood that the MV of the first reconstruction block relative to the corresponding region in the virtual reference frame may be used as a MV of the current block. In this embodiment, when the video is encoded, when the first resolution of the current block is greater than the second resolution of the reference block, the reconstruction block of the reference block may be adjusted to the first resolution, to obtain the first reconstruction block, so that directional prediction may be performed on the current block according to the first reconstruction block and the current block with the same resolution. In this embodiment of this application, the resolution of the current block needs to be adjusted. The adjustment herein may be performed on the resolution of the reconstruction block of the reference block, so that directional prediction can be performed on the current block without actually changing the original reference block. Certainly, this may alternatively be applied to the encoding process.

It may be understood that reference may be made between the video encoding method of this embodiment of this application and the foregoing video decoding method.

In some embodiments, the adjusting a reconstruction block of the reference block to the first resolution to obtain a first reconstruction block includes: performing upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the performing directional prediction on the current block according to the first reconstruction block and the current block includes: performing directional prediction on the current block according to the first reference pixel and a prediction point in the current block, the prediction point being a pixel used for performing directional prediction in the current block. Because directional prediction is performed according to the reference pixels, during adjustment of the resolution of the reference block, up-sampling interpolation processing may be performed on the first reference pixel in the reconstruction block of the reference block without adjusting the entire reference block, thereby reducing consumption of computing resources.

In some embodiments, after the obtaining a first resolution used in encoding a current block and a second resolution used in encoding a reference block in a current video frame, the method further includes: adjusting, when the first resolution is less than the second resolution, a reconstruction block of the reference block to the first resolution to obtain a second reconstruction block; and performing directional prediction on the current block according to the second reconstruction block and the current block. When the first resolution is less than the second resolution, the reconstruction block of the reference block may be adjusted to the first resolution, to obtain the second reconstruction block, so that directional prediction may be performed on the current block according to the second reconstruction block and the current block with the same resolution. The reconstruction block of the reference block may be adjusted to the first resolution through downsampling.

In some embodiments, the adjusting a reconstruction block of the reference block to the first resolution to obtain a second reconstruction block includes: downsampling a second reference pixel in the reconstruction block of the reference block to the first resolution, to obtain the second reconstruction block, the second reference pixel being a pixel used for performing directional prediction on the current block in the reconstruction block of the reference block; and the performing directional prediction on the current block according to the second reconstruction block and the current block includes: performing directional prediction on the current block according to the second reference pixel and a prediction point in the current block, the prediction point being a pixel used for performing directional prediction in the current block. Because directional prediction is performed according to the reference pixels, during adjustment of the resolution of the reference block, the second reference pixel in the reconstruction block of the reference block may be downsampled without adjusting the entire reference block, thereby reducing consumption of computing resources.

In some embodiments, after the obtaining a first resolution used in encoding a current block and a second resolution used in encoding a reference block in a current video frame, the method further includes: determining a third reference pixel in the reference block when the first resolution is less than the second resolution, the third reference pixel being a pixel used for performing directional prediction on the current block in the reference block, and a resolution represented by the third reference pixel in the reference block being equal to the first resolution; and performing directional prediction on the current block according to the third reference pixel and a prediction point in the current block, the prediction point being a pixel used for performing directional prediction in the current block. In this embodiment of this application, when the first resolution is less than the second resolution, the reference block may be adjusted to the first resolution according to the foregoing embodiment, or the resolution of the reference block may not be adjusted, and a pixel at the corresponding position, that is, the third reference pixel, may be selected from the reference block for directional prediction, so that resolution adjustment is not required. When directional prediction is performed on the third reference pixel according to this embodiment of this application, and upsampling is required for directional prediction at the same resolution, because the second resolution is greater than the first resolution, uploading is not required, and pixels other than the third reference pixel may be used as interpolation results to be replaced during interpolation, thereby performing directional prediction.

For ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

Figure 8:
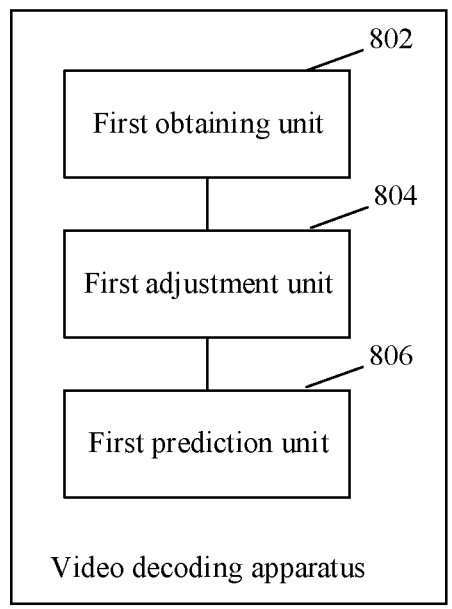
FIG. 8 is a schematic structural diagram of an exemplary video decoding apparatus according to an embodiment of this application.

According to still another aspect of the embodiments of this application, a video decoding apparatus for implementing the foregoing video decoding method is further provided. As shown in FIG. 8, the apparatus includes:

a first obtaining unit 802, configured to obtain a first resolution used in decoding a current block and a second resolution used in decoding a reference block in a current video frame, the reference block being a reference block used for performing directional prediction on the current block in the current video frame;

a first adjustment unit 804, configured to adjust, when the first resolution is greater than the second resolution, a reconstruction block of the reference block to the first resolution to obtain a first reconstruction block; and a first prediction unit 806, configured to perform directional prediction on the current block according to the first reconstruction block and the current block.

For specific embodiments, reference may be made to the examples shown in the foregoing video decoding method, and details are not described herein again in this example.

In some embodiments, the first adjustment unit includes: a first adjustment module, configured to perform upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the first prediction unit includes: a first prediction module, configured to perform directional prediction on the current block according to the first reference pixel and a prediction point in the current block, the prediction point being a pixel used for performing directional prediction in the current block.

For specific embodiments, reference may be made to the examples shown in the foregoing video decoding method, and details are not described herein again in this example.

In some embodiments, the foregoing apparatus may further include: a second adjustment unit, configured to adjust, when the first resolution is less than the second resolution, a reconstruction block of the reference block to the first resolution to obtain a second reconstruction block; and a second prediction unit, configured to perform directional prediction on the current block according to the second reconstruction block and the current block.

For specific embodiments, reference may be made to the examples shown in the foregoing video decoding method, and details are not described herein again in this example.

In some embodiments, the second adjustment unit includes: a second adjustment module, configured to downsample a second reference pixel in the reconstruction block of the reference block to the first resolution, to obtain the second reconstruction block, the second reference pixel being a pixel used for performing directional prediction on the current block in the reconstruction block of the reference block; and the second prediction unit includes: a second prediction module, configured to perform directional prediction on the current block according to the second reference pixel and a prediction point in the current block, the prediction point being a pixel used for performing directional prediction in the current block.

For specific embodiments, reference may be made to the examples shown in the foregoing video decoding method, and details are not described herein again in this example.

In some embodiments, the foregoing apparatus may further include: a determining unit, configured to determine a third reference pixel in the reference block when the first resolution is less than the second resolution, the third reference pixel being a pixel used for performing directional prediction on the current block in the reference block, and a resolution represented by the third reference pixel in the reference block being equal to the first resolution; and a third prediction unit, configured to perform directional prediction on the current block according to the third reference pixel and a prediction point in the current block, the prediction point being a pixel used for performing directional prediction in the current block.

For specific embodiments, reference may be made to the examples shown in the foregoing video decoding method, and details are not described herein again in this example.

Figure 9:
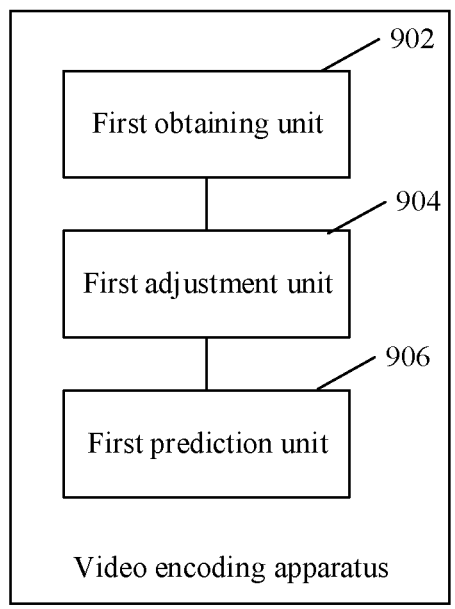
FIG. 9 is a schematic structural diagram of an exemplary video encoding apparatus according to an embodiment of this application.

According to still another aspect of the embodiments of this application, a video decoding apparatus is provided. As shown in FIG. 9, the apparatus includes:

a first obtaining unit 902, configured to obtain a first resolution used in encoding a current block and a second resolution used in encoding a reference block in a current video frame, the reference block being a reference block used for performing directional prediction on the current block in the current video frame;

a first adjustment unit 904, configured to adjust, when the first resolution is greater than the second resolution, a reconstruction block of the reference block to the first resolution to obtain a first reconstruction block; and a first prediction unit 906, configured to perform directional prediction on the current block according to the first reconstruction block and the current block.

For specific embodiments, reference may be made to the examples shown in the foregoing video encoding method, and details are not described herein again in this example.

In some embodiments, the first adjustment unit includes: a first adjustment module, configured to perform upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the first prediction unit includes: a first prediction module, configured to perform directional prediction on the current block according to the first reference pixel and a prediction point in the current block, the prediction point being a pixel used for performing directional prediction in the current block.

For specific embodiments, reference may be made to the examples shown in the foregoing video encoding method, and details are not described herein again in this example.

In some embodiments, the foregoing apparatus may further include: a second adjustment unit, configured to adjust, when the first resolution is less than the second resolution, a reconstruction block of the reference block to the first resolution to obtain a second reconstruction block; and a second prediction unit, configured to perform directional prediction on the current block according to the second reconstruction block and the current block.

For specific embodiments, reference may be made to the examples shown in the foregoing video encoding method, and details are not described herein again in this example.

In an optional solution, the second adjustment unit includes: a second adjustment module, configured to downsample a second reference pixel in the reconstruction block of the reference block to the first resolution, to obtain the second reconstruction block, the second reference pixel being a pixel used for performing directional prediction on the current block in the reconstruction block of the reference block; and the second prediction unit includes: a second prediction module, configured to perform directional prediction on the current block according to the second reference pixel and a prediction point in the current block, the prediction point being a pixel used for performing directional prediction in the current block.

For specific embodiments, reference may be made to the examples shown in the foregoing video encoding method, and details are not described herein again in this example.

In some embodiments, the foregoing apparatus may further include: a determining unit, configured to determine a third reference pixel in the reference block when the first resolution is less than the second resolution, the third reference pixel being a pixel used for performing directional prediction on the current block in the reference block, and a resolution represented by the third reference pixel in the reference block being equal to the first resolution; and a third prediction unit, configured to perform directional prediction on the current block according to the third reference pixel and a prediction point in the current block, the prediction point being a pixel used for performing directional prediction in the current block.

For specific embodiments, reference may be made to the examples shown in the foregoing video encoding method, and details are not described herein again in this example.

Figure 10:
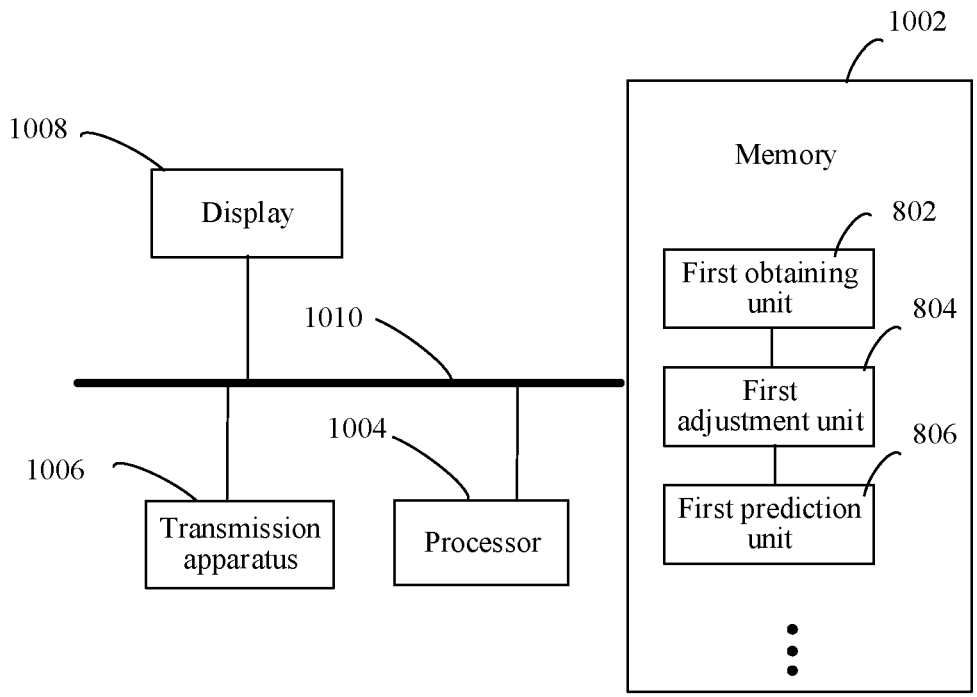
FIG. 10 is a schematic structural diagram of an exemplary electronic device according to an embodiment of this application.

According to still another aspect of the embodiments of this application, an electronic device configured to implement the foregoing video decoding method is further provided. As shown in FIG. 10, the electronic device includes a memory and a processor, the memory storing computer-readable instructions, and the processor being configured to perform the steps in any one of the foregoing method embodiments through the computer-readable instructions.

In some embodiments, the electronic device may be located in at least one of a plurality of network devices of a computer network.

In some embodiments, the foregoing processor may be configured to perform the following steps by using computer-readable instructions:

obtaining a first resolution used in decoding a current block and a second resolution used in decoding a reference block in a current video frame, the reference block being a reference block used for performing directional prediction on the current block in the current video frame;

adjusting, when the first resolution is greater than the second resolution, a reconstruction block of the reference block to the first resolution to obtain a first reconstruction block; and performing directional prediction on the current block according to the first reconstruction block and the current block.

The video decoding method shown in FIG. 2 may be used in, but not limited to, the video decoder shown in FIG. 1. The decoding process of the current video frame is completed through interaction of the video decoder and other components.

In some embodiments, a person of ordinary skill in the art may understand that, the structure shown in FIG. 10 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 10 does not constitute a limitation on the structure of the electronic device. For example, the electronic device may further include more or fewer components (such as a network interface) than those shown in FIG. 10, or have a configuration different from that shown in FIG. 10.

The memory 1002 may be configured to store computer-readable instructions and modules, for example, computer-readable instructions/modules corresponding to the video decoding method and apparatus in the embodiments of this application. The processor 1004 performs various functional applications and data processing by running the computer-readable instructions and modules stored in the memory 1002, that is, implementing the foregoing video decoding method. The memory 1002 may include a high-speed random memory, and may also include a non-volatile memory, for example, one or more magnetic storage apparatuses, a flash memory, or another non-volatile solid-state memory. In some embodiments, the memory 1002 may further include memories remotely disposed relative to the processor 1004, and the remote memories may be connected to a terminal through a network. Examples of the network include, but are not limited to, the Internet, an intranet, a local area network, a mobile communication network, and a combination thereof. The memory 1002 may be further configured to, but not limited to, store information such as a current block. In an example, as shown in FIG. 10, the memory 1002 may include, but is not limited to, the first obtaining unit 802, the first adjustment unit 804, and the first prediction unit 806 in the foregoing video decoding apparatus. In addition, the memory may further include, but not limited to, other modules and units in the foregoing video decoding apparatus, and details are not described herein again in this example.

In some embodiments, a transmission apparatus 1006 is configured to receive or transmit data through a network. Specific examples of the network may include a wired network and a wireless network. In an example, the transmission apparatus 1006 includes a network interface controller (NIC). The NIC may be connected to another network device and a router by using a network cable, to communicate with the Internet or a local area network. In an example, the transmission apparatus 1006 is a radio frequency (RF) module, which communicates with the Internet in a wireless manner.

In addition, the foregoing electronic device further includes: a display 1008, configured to display a decoded video; and a connection bus 1010, configured to connect various module components in the electronic device.

Figure 11:
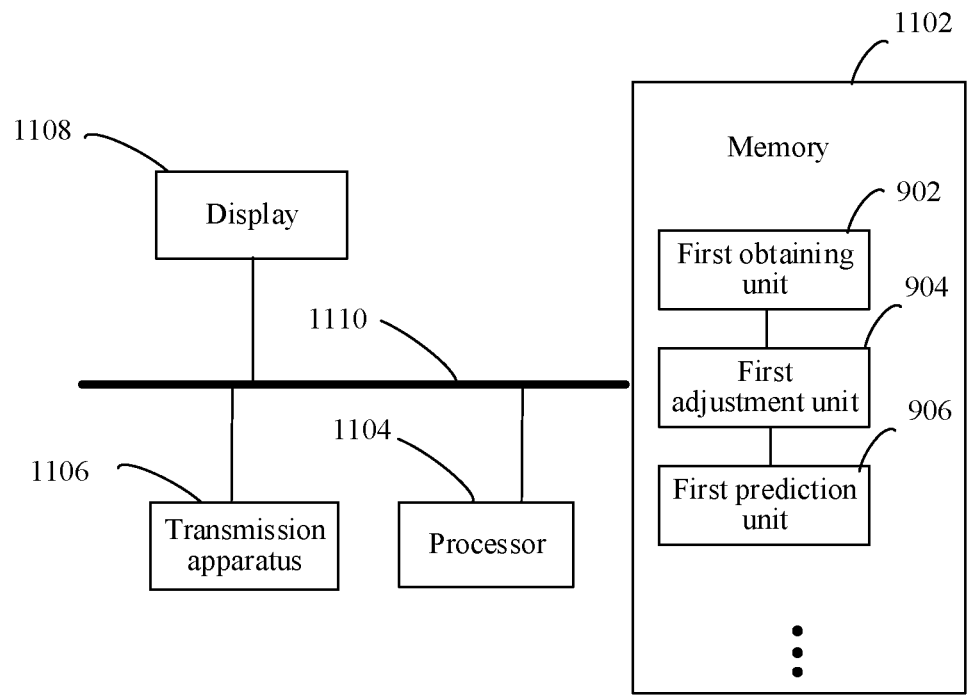
FIG. 11 is a schematic structural diagram of another exemplary electronic device according to an embodiment of this application.

According to still another aspect of the embodiments of this application, an electronic device configured to implement the foregoing video encoding method is further provided. As shown in FIG. 11, the electronic device includes a memory 1102 and a processor 1104, the memory 1102 storing computer-readable instructions, and the processor 1104 being configured to perform the steps in any one of the foregoing method embodiments through the computer-readable instructions.

In some embodiments, the electronic device may be located in at least one of a plurality of network devices of a computer network.

In some embodiments, the foregoing processor may be configured to perform the following steps by using computer-readable instructions:

obtaining a first resolution used in encoding a current block and a second resolution used in encoding a reference block in a current video frame, the reference block being a reference block used for performing directional prediction on the current block in the current video frame;

adjusting, when the first resolution is greater than the second resolution, a reconstruction block of the reference block to the first resolution to obtain a first reconstruction block; and performing directional prediction on the current block according to the first reconstruction block and the current block.

In some embodiments, a person of ordinary skill in the art may understand that, the structure shown in FIG. 11 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 11 does not constitute a limitation on the structure of the electronic device. For example, the electronic device may further include more or fewer components (such as a network interface) than those shown in FIG. 11, or have a configuration different from that shown in FIG. 11.

The memory 1102 may be configured to store computer-readable instructions and modules, for example, computer-readable instructions/modules corresponding to the video encoding method and apparatus in the embodiments of this application. The processor 1104 performs various functional applications and data processing by running the computer-readable instructions and modules stored in the memory 1102, that is, implementing the foregoing video encoding method. The memory 1102 may include a high-speed random memory, and may also include a non-volatile memory, for example, one or more magnetic storage apparatuses, a flash memory, or another non-volatile solid-state memory. In some embodiments, the memory 1102 may further include memories remotely disposed relative to the processor 1104, and the remote memories may be connected to a terminal through a network. Examples of the network include, but are not limited to, the Internet, an intranet, a local area network, a mobile communication network, and a combination thereof. The memory 1102 may be further configured to, but not limited to, store information such as a current block. In an example, as shown in FIG. 11, the memory 1102 may include, but is not limited to, the first obtaining unit 902, the first adjustment unit 904, and the first prediction unit 906 in the foregoing video encoding apparatus. In addition, the memory may further include, but not limited to, other modules and units in the foregoing video encoding apparatus, and details are not described herein again in this example.

In some embodiments, a transmission apparatus 1106 is configured to receive or transmit data through a network. Specific examples of the network may include a wired network and a wireless network. In an example, the transmission apparatus 1106 includes a network interface controller (NIC). The NIC may be connected to another network device and a router by using a network cable, to communicate with the Internet or a local area network. In an example, the transmission apparatus 1106 is a radio frequency (RF) module, which communicates with the Internet in a wireless manner.

In addition, the foregoing electronic device further includes: a display 1108, configured to display a video before encoding; and a connection bus 1110, configured to connect various module components in the electronic device.

An embodiment of this application further provides a storage medium, storing computer-readable instructions, the computer-readable instructions being configured to perform the steps in any one of the foregoing method embodiments when being run.

In some embodiments, the storage medium may be configured to store computer-readable instructions for performing the following steps:

S1. Obtain a first resolution used in decoding a current block and a second resolution used in decoding a reference block in a current video frame, the reference block being a reference block used for performing directional prediction on the current block in the current video frame, and build a reconstruction block from the reference block.

S2. When the first resolution is greater than the second resolution, adjust the reconstruction block of the reference block to the first resolution to obtain a first reconstruction block.

S3. Perform directional prediction on the current block according to the first reconstruction block and the current block.

In some embodiments, the storage medium is further configured to store a computer-readable instruction configured to perform the following steps:

S1. Obtain a first resolution used in encoding a current block and a second resolution used in encoding a reference block in a current video frame, the reference block being a reference block used for performing directional prediction on the current block in the current video frame and build a reconstruction block from the reference block.

S2. When the first resolution is greater than the second resolution, adjust the reconstruction block of the reference block to the first resolution to obtain a first reconstruction block.

S3. Perform directional prediction on the current block according to the first reconstruction block and the current block.

In some embodiments, the storage medium is further configured to store computer-readable instructions for performing the steps included in the methods according to the foregoing embodiments, and details are not repeated in this embodiment.

In some embodiments, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a read-only memory (ROM), a random access memory (RAM), a magnetic disk, a compact disc, and the like.

The sequence numbers of the foregoing embodiments of this application are merely for description purpose, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in the form of a software product. The computer program product is stored in a storage medium and includes several instructions for instructing one or more computer devices (which may be a personal computer, a server, a network device, or the like) to perform all or some of the steps of the methods described in the embodiments of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In the foregoing embodiments of this application, the descriptions of the embodiments have respective focuses. For a part that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video coding method performed by an electronic device, the method comprising:
   obtaining a first resolution used in decoding a current block and a second resolution used in decoding a reference block in a current video frame, the reference block being used for performing directional prediction on the current block in the current video frame;
   building a reconstruction block from the reference block;
   when the first resolution is greater than the second resolution:
      adjusting the reconstruction block of the reference block to the first resolution to obtain a first reconstruction block; and
      performing directional prediction on the current block according to the first reconstruction block and the current block; and
   when the first resolution is less than the second resolution:
      adjusting the reconstruction block of the reference block to the first resolution to obtain a second reconstruction block; and
      performing directional prediction on the current block according to the second reconstruction block and the current block.

2. The method according to claim 1, wherein the adjusting the reconstruction block of the reference block to the first resolution to obtain a first reconstruction block comprises:
   performing upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and
   the performing directional prediction on the current block according to the first reconstruction block and the current block comprises:
      performing directional prediction on the current block according to the first reference pixel and a prediction point in the current block, the prediction point being a pixel used for performing directional prediction in the current block.

3. The method according to claim 1, wherein the current block is coded from the second reconstruction block via intra-frame coding.

4. The method according to claim 1, wherein the adjusting a reconstruction block of the reference block to the first resolution to obtain a second reconstruction block comprises:
   downsampling a second reference pixel in the reconstruction block of the reference block to the first resolution, to obtain the second reconstruction block, the second reference pixel being a pixel used for performing directional prediction on the current block in the reconstruction block of the reference block; and
   the performing directional prediction on the current block according to the second reconstruction block and the current block comprises:
      performing directional prediction on the current block according to the second reference pixel and a prediction point in the current block, the prediction point being a pixel used for performing directional prediction in the current block.

5. The method according to claim 1, wherein the method further comprises:
   after obtaining the first resolution used in coding the current block and the second resolution used in coding the reference block in the current video frame,
   determining a third reference pixel in the reference block when the first resolution is less than the second resolution, the third reference pixel being a pixel used for performing directional prediction on the current block in the reference block, and a resolution represented by the third reference pixel in each reference block being equal to the first resolution; and
   performing directional prediction on the current block according to the third reference pixel and a prediction point in the current block, the prediction point being a pixel used for performing directional prediction in the current block.

6. The method according to claim 1, wherein the current block is coded from the first reconstruction block via intra-frame coding.

7. An electronic device, comprising a memory and one or more processors, the memory storing computer-readable instructions, and the computer-readable instructions, when executed by the one or more processors, cause the electronic device to perform a plurality of operations including:
   obtaining a first resolution used in coding a current block and a second resolution used in coding a reference block in a current video frame, the reference block being used for performing directional prediction on the current block in the current video frame;
   building a reconstruction block from the reference block;
   when the first resolution is greater than the second resolution:

adjusting the reconstruction block of the reference block to the first resolution to obtain a first reconstruction block; and performing directional prediction on the current block according to the first reconstruction block and the current block; and when the first resolution is less than the second resolution:

adjusting the reconstruction block of the reference block to the first resolution to obtain a second reconstruction block; and performing directional prediction on the current block according to the second reconstruction block and the current block.

8. The electronic device according to claim 7, wherein the adjusting the reconstruction block of the reference block to the first resolution to obtain a first reconstruction block comprises:

performing upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the performing directional prediction on the current block according to the first reconstruction block and the current block comprises:

performing directional prediction on the current block according to the first reference pixel and a prediction point in the current block, the prediction point being a pixel used for performing directional prediction in the current block.

9. The electronic device according to claim 7, wherein the current block is coded from the second reconstruction block via intra-frame coding.

10. The electronic device according to claim 7, wherein the adjusting a reconstruction block of the reference block to the first resolution to obtain a second reconstruction block comprises:

downsampling a second reference pixel in the reconstruction block of the reference block to the first resolution, to obtain the second reconstruction block, the second reference pixel being a pixel used for performing directional prediction on the current block in the reconstruction block of the reference block; and the performing directional prediction on the current block according to the second reconstruction block and the current block comprises:

performing directional prediction on the current block according to the second reference pixel and a prediction point in the current block, the prediction point being a pixel used for performing directional prediction in the current block.

11. The electronic device according to claim 7, wherein the plurality of operations further comprise:

after obtaining the first resolution used in coding the current block and the second resolution used in coding the reference block in the current video frame, determining a third reference pixel in the reference block when the first resolution is less than the second resolution, the third reference pixel being a pixel used for performing directional prediction on the current block in the reference block, and a resolution represented by the third reference pixel in each reference block being equal to the first resolution; and performing directional prediction on the current block according to the third reference pixel and a prediction point in the current block, the prediction point being a pixel used for performing directional prediction in the current block.

12. The electronic device according to claim 7, wherein the current block is coded from the first reconstruction block via intra-frame coding.

13. One or more non-transitory computer-readable storage media, storing computer-readable instructions, the computer-readable instructions, when executed by one or more processors of an electronic device, cause the electronic device to perform a plurality of operations including:

obtaining a first resolution used in coding a current block and a second resolution used in coding a reference block in a current video frame, the reference block being used for performing directional prediction on the current block in the current video frame;

building a reconstruction block from the reference block;

when the first resolution is greater than the second resolution:

adjusting the reconstruction block of the reference block to the first resolution to obtain a first reconstruction block; and performing directional prediction on the current block according to the first reconstruction block and the current block; and when the first resolution is less than the second resolution:

adjusting the reconstruction block of the reference block to the first resolution to obtain a second reconstruction block; and performing directional prediction on the current block according to the second reconstruction block and the current block.

14. The non-transitory computer-readable storage media according to claim 13, wherein the adjusting the reconstruction block of the reference block to the first resolution to obtain a first reconstruction block comprises:

performing upsampling interpolation processing on a first reference pixel in the reconstruction block of the reference block to the first resolution, to obtain the first reconstruction block, the first reference pixel being a pixel used for performing directional prediction on the current block in the reconstruction block of the reference block; and the performing directional prediction on the current block according to the first reconstruction block and the current block comprises:

performing directional prediction on the current block according to the first reference pixel and a prediction point in the current block, the prediction point being a pixel used for performing directional prediction in the current block.

15. The non-transitory computer-readable storage media according to claim 13, wherein the adjusting a reconstruction block of the reference block to the first resolution to obtain a second reconstruction block comprises:

downsampling a second reference pixel in the reconstruction block of the reference block to the first resolution, to obtain the second reconstruction block, the second reference pixel being a pixel used for performing directional prediction on the current block in the reconstruction block of the reference block; and the performing directional prediction on the current block according to the second reconstruction block and the current block comprises:

performing directional prediction on the current block according to the second reference pixel and a prediction point in the current block, the prediction point being a pixel used for performing directional prediction in the current block.

16. The non-transitory computer-readable storage media according to claim 13, wherein the plurality of operations further comprise:
   after obtaining the first resolution used in coding the current block and the second resolution used in coding the reference block in the current video frame,
   determining a third reference pixel in the reference block when the first resolution is less than the second resolution, the third reference pixel being a pixel used for performing directional prediction on the current block in the reference block, and a resolution represented by the third reference pixel in each reference block being equal to the first resolution; and
   performing directional prediction on the current block according to the third reference pixel and a prediction point in the current block, the prediction point being a pixel used for performing directional prediction in the current block.

17. The non-transitory computer-readable storage media according to claim 13, wherein the current block is coded from the first reconstruction block via intra-frame decoding.

* * * * *